US012791806B2

(12) United States Patent
Bois et al.

(10) Patent No.: US 12,791,806 B2
(45) Date of Patent: Nov. 10, 2026

(54) CONFIGURING INDEX OF REFRACTION IN A PHOTONIC INTEGRATED CIRCUIT

(71) Applicant: Ciena Corporation, Hanover, MD (US)

(72) Inventors: Antoine Bois, Quebec (CA); Alexandre D. Simard, Quebec (CA)

(73) Assignee: Ciena Corporation, Hanover, MD (US)

( * ) Notice: Subject to any disclaimer, the term of this patent is extended or adjusted under 35 U.S.C. 154(b) by 311 days.

(21) Appl. No.: 18/420,388

(22) Filed: Jan. 23, 2024

(65) Prior Publication Data

US 2025/0237828 A1 Jul. 24, 2025

(51) Int. Cl.
*G02B 6/42* (2006.01)
*G02F 1/295* (2006.01)

(52) U.S. Cl.
CPC ......... *G02B 6/4286* (2013.01); *G02B 6/4215* (2013.01); *G02F 1/295* (2013.01)

(58) Field of Classification Search
CPC .................................................... G02B 6/4285
See application file for complete search history.

(56) References Cited

U.S. PATENT DOCUMENTS 5,832,148 A * 11/1998 Yariv .................... G02F 1/3137 385/24
7,471,859 B2 * 12/2008 Levner .................... G02F 1/035 385/129
11,686,955 B2 6/2023 Meng et al.
11,734,556 B2 8/2023 Meng et al.
2017/0194310 A1 7/2017 Evans et al.
2017/0351293 A1 12/2017 Carolan et al.
2021/0278707 A1 9/2021 Moss et al.

OTHER PUBLICATIONS

N. C. Harris et al., "Linear programmable nanophotonic processors", Optica 5, pp. 1623-1631, DOI: 10.1364/OPTICA.5.001623.
M. W. Geis et al., "Submicrosecond submilliwatt silicon-on-insulator thermooptic switch", IEEE Photonics Technology Letters, vol. 16, No. 11, pp. 2514-2516, Nov. 2004, DOI: 10.1109/LPT.2004.835194.

* cited by examiner

*Primary Examiner* — Lisa M Caputo
(74) *Attorney, Agent, or Firm* — Young Basile Hanlon & MacFarlane, P.C.

(57) ABSTRACT

An article of manufacture comprises: a waveguide portion; index-modifying elements (IMEs) in proximity to the waveguide portion, each configured to modify an index of refraction of the waveguide portion based on a respective electrical signal; an electrical power source (EPS) configured to supply one or more electrical signals; modifiable electrical elements (MEEs), each configured to be modifiable at least once between a conductive configuration that conducts electricity and a nonconductive configuration that does not conduct electricity, and each electrically connected to the EPS and to one or more respective IMEs; a closed electrical path, where electrical current flows from the EPS and through (1) a first MEE that is configured to be in a conductive configuration, and (2) a first IME; and an open electrical path, where no electrical current flows through (1) a second MEE that is configured to be in a nonconductive configuration, and (2) a second IME.

20 Claims, 10 Drawing Sheets

CONFIGURING INDEX OF REFRACTION IN A PHOTONIC INTEGRATED CIRCUIT

TECHNICAL FIELD

This disclosure relates to configuring index of refraction in a photonic integrated circuit.

BACKGROUND

Complementary metal-oxide-semiconductor (CMOS) processes and other fabrication techniques can be used to fabricate electronic integrated circuits (EICs) that operate using electrical signals (e.g., voltage signals and/or current signals). Similar fabrication techniques can be used to fabricate photonic integrated circuits (PICs) in a silicon photonic platform or in other integrated photonic platforms. A silicon on insulator platform is an example of a silicon photonic platform that can be used to make opto-electrical active devices, optical passive devices, and optical waveguides in a silicon layer. In a silicon on insulator platform, the optical signals can be transmitted by optical waveguides and can be confined within the silicon layer, for example, because there is an underlying buried oxide (BOX) layer made up of thermal silicon dioxide (i.e., silicon oxidized using a thermal process) and an overlying silicon dioxide cladding surrounding the silicon layers. In such examples, the index contrast between the high index of refraction of silicon and the low index of refraction of silicon dioxide can be responsible for the confinement. Some advantages of silicon photonic platforms are the ability to make both active and passive devices, and the ability to make compact PICs due to the high index contrast between silicon and silicon dioxide.

SUMMARY

In one aspect, in general, a method for fabricating a photonic integrated circuit comprises: forming a first waveguide portion; forming a first set of index-modifying elements located in proximity to the first waveguide portion, each configured to modify an index of refraction of the first waveguide portion based on a respective electrical signal; forming an electrical power source configured to supply one or more electrical signals; forming a first set of modifiable electrical elements, each configured to be modifiable at least once between a conductive configuration that conducts electricity and a nonconductive configuration that does not conduct electricity, and each electrically connected to the electrical power source and to one or more respective index-modifying elements in the first set of index-modifying elements; transmitting a first optical wave portion through the first waveguide portion; determining first optical wave information associated with the first optical wave portion after it traverses the first waveguide portion; and modifying one or more modifiable electrical elements in the first set of modifiable electrical elements based at least in part on the first optical wave information.

Aspects can include one or more of the following features.

Where the first optical wave information is associated with at least one of a first phase or a first optical power of the first optical wave portion.

Where modifying one or more modifiable electrical elements in the first set of modifiable electrical elements modifies at least one of a real component or an imaginary component of the index of refraction of the first waveguide portion.

Where modifying one or more modifiable electrical elements in the first set of modifiable electrical elements comprises applying a laser pulse or applying electrical power above a threshold value.

Where modifying one or more modifiable electrical elements in the first set of modifiable electrical elements comprises adding or removing one or more (1) wire bonds, (2) flip-chip bumps, or (3) redistribution layers.

The method further comprises forming a second waveguide portion non-overlapping with the first waveguide portion; forming a second set of index-modifying elements located in proximity to the second waveguide portion, each configured to modify an index of refraction of the second waveguide portion based on a respective electrical signal; forming a second set of modifiable electrical elements, each configured to be modifiable at least once between a conductive configuration that conducts electricity and a nonconductive configuration that does not conduct electricity, and each electrically connected to the electrical power source and to one or more respective index-modifying elements in the second set of index-modifying elements; transmitting a second optical wave portion through the second waveguide portion; determining second optical wave information associated with the second optical wave portion after it traverses the second waveguide portion; and modifying one or more modifiable electrical elements in the first set of modifiable electrical elements or in the second set of modifiable electrical elements, based at least in part on the first optical wave information and the second optical wave information.

Where the second optical wave information is associated with at least one of a second phase or a second optical power of the second optical wave portion.

Where the first optical wave information and the second optical wave information are collectively associated with a difference in phase or a difference in optical power between the first optical wave portion and the second optical wave portion.

In another aspect, in general, an article of manufacture comprises: a first waveguide portion; a first set of index-modifying elements located in proximity to the first waveguide portion, each configured to modify an index of refraction of the first waveguide portion based on a respective electrical signal; an electrical power source configured to supply one or more electrical signals; a first set of modifiable electrical elements, each configured to be modifiable at least once between a conductive configuration that conducts electricity and a nonconductive configuration that does not conduct electricity, and each electrically connected to the electrical power source and to one or more respective index-modifying elements in the first set of index-modifying elements; a closed electrical path, where electrical current flows from the electrical power source and through (1) a first modifiable electrical element in the first set of modifiable electrical elements that is configured to be in a conductive configuration, and (2) a first index-modifying element in the first set of index-modifying elements; and an open electrical path, where no electrical current flows through (1) a second modifiable electrical element in the first set of modifiable electrical elements that is configured to be in a nonconductive configuration, and (2) a second index-modifying element in the first set of index-modifying elements.

Aspects can include one or more of the following features.

Where the first of modifiable electrical elements comprises at least one of a wire bond, a flip-chip bump, a redistribution layer, or a fuse-like element.

Where the first set of index-modifying elements comprise at least one of a thermal phase-shifter, a PIN junction, or a non-centrosymmetric crystal.

Where each index-modifying element in the first set of index-modifying elements is located in proximity to a respective sub-portion of the first waveguide portion and modifies a respective index of refraction of the respective sub-portion of the first waveguide portion.

The article of manufacture further comprises a second waveguide portion; a second set of index-modifying elements located in proximity to the second waveguide portion, each configured to modify an index of refraction of the second waveguide portion based on a respective electrical signal; and a second set of modifiable electrical elements, each configured to be modifiable at least once between a conductive configuration that conducts electricity and a nonconductive configuration that does not conduct electricity, and each electrically connected to the electrical power source and to one or more respective index-modifying elements in the second set of index-modifying elements.

Where the first waveguide portion and the second waveguide portion form a portion of (1) a Mach-Zehnder interferometer, (2) a Michelson interferometer, (3) a multi-mode interferometer, (4) an interferometer comprising three or more optical paths, or (5) an N×M coupler comprising N input ports and M output ports.

Where the first waveguide portion and the second waveguide portion are each optically coupled to a first 2×2 coupler and to a second 2×2 coupler, and the first 2×2 coupler and the second 2×2 coupler each comprise two input optical ports and two output optical ports.

Where the first set of index-modifying elements comprises a first index-modifying element configured to modify the index of refraction of the first waveguide portion by a first amount for an applied voltage across the first index-modifying element; and a second index-modifying element configured to modify the index of refraction of the first waveguide portion by a second amount for an applied voltage across the second index-modifying element that is equal to the first applied voltage across the first index-modifying element; where the second amount is twice as large as the first amount.

Where the first set of index-modifying elements further comprises a third index-modifying element configured to modify the index of refraction of the first waveguide portion by a third amount that is twice as large as the second amount.

Where a third index-modifying element in the first set of index-modifying elements comprises a first portion at a first voltage; and a second portion at a second voltage that is equal to a voltage of a respective modifiable electrical element in the first set of modifiable electrical elements.

Where a fourth index-modifying element in the first set of index-modifying elements comprises a third portion at a third voltage; and a fourth portion at a fourth voltage that is equal to a voltage of a respective modifiable electrical element in the first set of modifiable electrical elements.

Where the third voltage is equal to either a ground voltage of the electrical power source or to the second voltage.

Aspects can have one or more of the following advantages.

The index-modifying configurations (IMCs) disclosed herein can be statically configured to provide a modification to the index of refraction of waveguides, thereby providing enhanced control over the phase of optical waves guided by the waveguides. In some examples, the IMCs can have lower power consumption by utilizing electrical power sources that are also used to electrically power other components on the die or on a companion die.

IMCs can also be utilized to increase the known good die yield of dies produced from semiconductor wafers. In some examples, IMCs can reduce die failure rates that occur due to extinction ratio metrics that characterize, for example, the transmitting ports of photonic integrated circuits (PICs). Furthermore, IMCs can control the operating point of interferometric devices by balancing optical losses in different optical paths (e.g., by modifying the imaginary component of the index of refraction), so as to improve the extinction ratio, to improve the common-mode rejection ratio, or to adjust the optical power splitting ratio (e.g., to achieve higher accuracy of the hybrid angle).

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
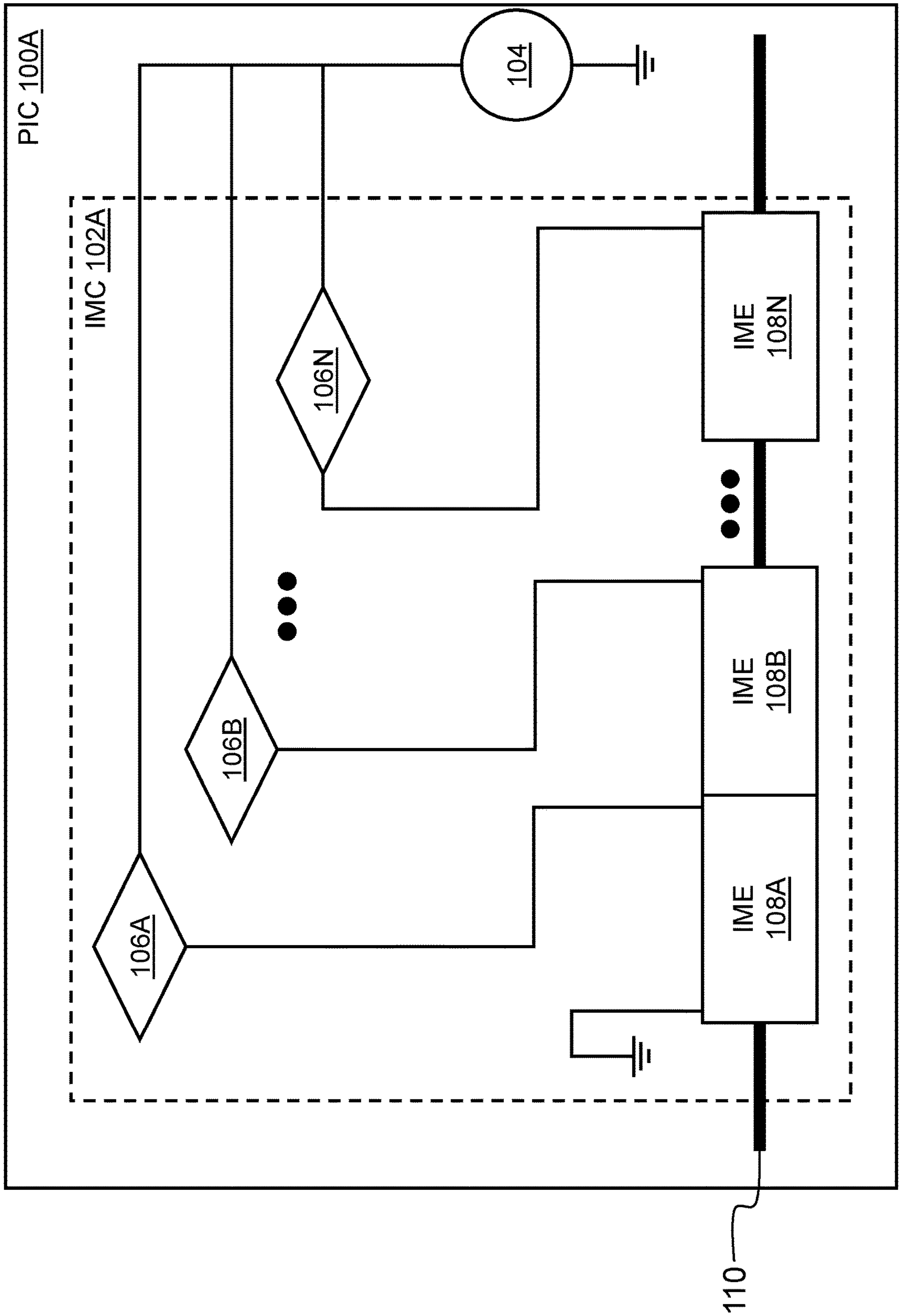
FIG. 1A is a schematic diagram of an example photonic integrated circuit.

One challenge in designing photonic integrated circuits (PICs) can be the unpredictability of the phase of optical waves during or after propagation through passive optical components or subcircuits. For example, nanometer scale variations in the spatial dimensions of a waveguide (e.g., in the width or the height) can modify the index of refraction of the waveguide, such that the phase of optical waves guided by the waveguide can substantially deviate from modelled behavior. In general, the absolute phase of an optical wave may be irrelevant while the difference in phase between two optical modes (e.g., two optical modes in the same waveguide, or one mode in a first waveguide and a second mode in a second waveguide) can be important. However, the small variations in the spatial dimensions of one or more waveguides can similarly result in a relative phase difference between two optical modes that is often larger than $2\pi$ after sub-micrometer propagation.

In general, there are several approaches that can be used to achieve a desired phase or loss associated with one or more waveguides in a PIC that guide optical waves.

In a first approach, dies that perform below a threshold for one or more metrics (e.g., extinction ratio) can be yielded out during a wafer-level test, thereby resulting in increased cost and decreased manufacturing efficiency.

In a second approach, a voltage or current output by a biasing circuit can be dynamically modified so as to adjust one or more index-modifying elements (AIEs) to correct imbalances in phase modulation that result in phase variation of an optical carrier (e.g., chirp) at the output of a modulator. For example, different PN junction biases in each optical path (i.e., arm) lead to different optical losses, making such balancing possible. Dynamically modifying the output of the biasing circuit, however, can lead to increases in complexity, power consumption, and an increased footprint size. Furthermore, the additional bias applied by the biasing circuit can have an impact on the $V_\pi$ of the modulator (i.e., the amount of voltage required to produce a phase change of $\pi$), which can affect the chirp resulting from the modulator and may require compromises in other characteristics (e.g., in RF bandwidth, optical bandwidth, impedance, or RF phase velocity). Additionally, the applicability of this approach is limited to PICs comprising a modulator.

In a third approach, high-intensity laser pulses can be applied to one or more waveguide materials (e.g., silicon) so as to perform static modifications to the index of refraction of the waveguide. To perform such modifications, dedicated equipment and process lines may be required, which can be costly or time consuming in a high-volume application. Furthermore, such modifications can increase optical losses in addition to creating a phase shift, which may be undesirable in some applications.

In a fourth approach, the propagation length over which two paths of an optical wave propagate is reduced to nearly zero, thereby reducing the change in relative phase between the two paths. Such a technique, however, can lead to distortions in the optical waves that result in optical losses and can be otherwise limiting by requiring short propagation lengths.

In a fifth approach, PICs can be cointegrated with electronic integrated circuits (EICS) by utilizing flip-chip assemblies or wirebond assemblies, for example. In such examples, one or more digital-to-analog converters (DACs) can be used to modify the index of refraction of a waveguide, such as by applying a thermo-optic effect, a carrier-based effect (e.g., the plasma dispersion effect), or an electro-optic effect (e.g., the Pockels effect). In general, the number of DACs that can be utilized may be limited by: (1) the number of input and outputs available on the PIC (e.g., the number of wire bonds, flip-chip bumps, or through-silicon vias), (2) the footprint the DACs occupy on a companion die, an application-specific integrated circuit (ASIC), or a circuit board, or (3) the power consumption, cost, and complexity the DACs add to an application. Compared to applications that utilize a static electrical power source, a DAC presents additional overhead that can be detrimental for certain applications.

Some of the example approaches for controlling phase and/or loss disclosed herein include index-modifying configurations (IMCs) comprising one or more modifiable electrical elements (MEEs) that are modifiable at least once between a conductive configuration that conducts electricity and a nonconductive configuration that does not conduct electricity. Examples of MEEs include wire bonds, flip-chip bumps, redistribution layers, and fuse-like elements. The IMCs disclosed herein also comprise one or more index-modifying elements (IMEs) that each modify an index of refraction of a waveguide portion based on a respective electrical signal. As used herein, the index of refraction comprises both a real component, which is associated with the phase velocity of an optical wave, and an imaginary component, which is associated with the attenuation (i.e., loss) of an optical wave. The IMCs disclosed herein enable static modification of the real and/or imaginary components of the index of refraction of a waveguide within a PIC. As used herein, a waveguide can be any structure that guides or confines any number of optical waves. In some examples, the waveguide can be a portion of (1) a Mach-Zehnder interferometer, (2) a Michelson interferometer, (3) a multimode interferometer, (4) a Fabry-Perot cavity, (5) a ring resonator, (6) a grating, (7) an electro-optic modulator, (8) an interferometer comprising three or more optical paths (also referred to as a multi-leg interferometer), or (9) an N×M coupler comprising N input ports and M output ports.

In some examples, the MEEs of an IMC are fuse-like elements that can be modified from a conductive state to a nonconductive state by applying electrical power through them above a threshold value. After such a modification, the MEEs prevent electrical power from flowing to respective IMEs that modify the phase shift of an optical wave (i.e., the real component of the index of refraction of a waveguide) and/or the optical losses of an optical wave (i.e., the imaginary component of the index of refraction of a waveguide). In some examples, the MEEs can be modified once (i.e., in a "set and forget" manner) during wafer-level testing or during assembly, thereby enabling the production of self-configurable PICs for applications that utilize a static configuration of the index of refraction of a waveguide.

IMCs can take advantage of the availability of fixed (i.e., statically configured) voltages on a PIC or on an EIC electrically connected to the PIC. Examples of such fixed voltages include electrical power sources that provide electrical power to photodiodes, modulators, transimpedance amplifiers (TIAs), drivers, or other companion chips (e.g., voltages such as $V_{cc}$ or $V_{dd}$). Examples of IEs include thermal phase-shifters (TPSs), PIN junctions, and non-centrosymmetric crystals (e.g., composed of barium borate or potassium niobate). The voltages provided to the AIEs may be applied (or not applied) in a binary manner by utilizing one or more MEEs that can be modified, for example, by performing laser cuts, laser ablation, or by applying electrical power above a threshold value so as to create an open circuit by blowing one or more fuses that may be composed of small cross-sections of metal traces or metal vias. In some examples, the configurations of the MEEs (i.e., which MEEs are set to a conductive configuration and which are set to a nonconductive configuration) can be determined during or following wafer characterization. In other examples (e.g., where a PIC and one or more voltage sources are cointegrated as separate chips), assembly steps may involve selectively adding or removing wire bonds, flip-chip bumps, or redistribution layers (RDLs), for example, so as to toggle one or more MEEs between a conductive configuration and a nonconductive configuration.

FIG. 1A shows an example PIC 100A comprising an IMC 102A. An electrical power source 104 is located on the PIC 100A and is electrically connected to N MEEs that include a first MEE 106A, a second MEE 106B, and an $N^{th}$ MEE 106N, with three black dots representing the remaining MEEs. Each MEE is electrically connected to a respective IME, such that the first MEE 106A is electrically connected to a first IME 108A, the second MEE 106B is electrically connected to the second IME 108B, and the $N^{th}$ MEE 106N is electrically connected to an $N^{th}$ IME 108N, with three black dots representing the remaining IMEs. The IMEs are located in proximity to a waveguide 110 (or respective sub-portions, as summarized above) and modify an index of refraction over respective portions of the waveguide 110 (or respective sub-portions, as summarized above) based on respective electrical signals received by the MEEs and the electrical power source 104. In this example, the IMEs are all serially electrically connected to one another (e.g., the right side of the first IME 108A is electrically connected to the left side of the second IME 108B). Such a configuration can be used, for example, when the IMEs are thermal phase shifters that change the index of refraction of the waveguide 110 based on the amount of electrical power dissipated across the IMEs.

Figure 1B:
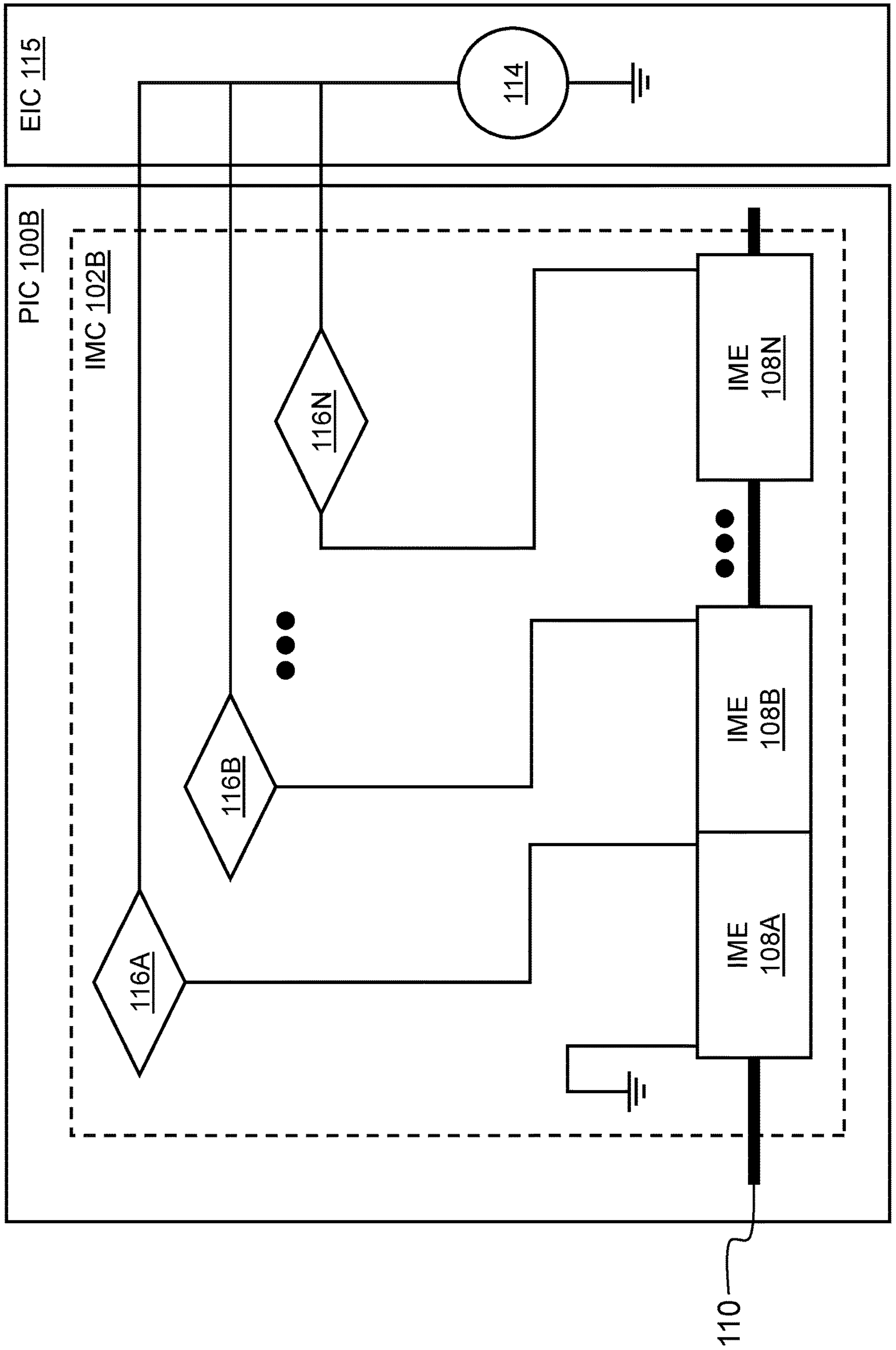
FIG. 1B is a schematic diagram of an example photonic integrated circuit.

FIG. 1B shows an example PIC 100B, comprising an IMC 102B, electrically connected to an EIC 115 (electronic integrated circuit). An electrical power source 114 is located on the EIC 115 and is electrically connected to N MEEs that include a first MEE 116A, a second MEE 116B, and an $N^{th}$ MEE 116N, with three black dots representing the remaining MEEs. Each MEE is electrically connected to a respective IME, such that the first MEE 116A is electrically connected to a first IME 108A, the second MEE 116B is electrically connected to the second IME 108B, and the $N^{th}$ MEE 116N is electrically connected to an $N^{th}$ IME 108N, with three black dots representing the remaining IMEs. The IMEs are located in proximity to a waveguide 110 and modify an index of refraction over respective portions of the waveguide 110 based on respective electrical signals received by the MEEs and the electrical power source 114. In this example, the IMEs are all serially electrically connected to one another (e.g., the right side of the first IME 108A is electrically connected to the left side of the second IME 108B). In some examples, the MEEs may be wire bonds, flip-chip bumps, or through-silicon vias, for example, that selectively electrically connect the EIC 115 to the PIC 100B.

In general, cascading two or more IMEs in series or in parallel can enable high resolution control of the index of refraction being modified. For example, one or more IMEs can be toggled on or off so as to each generate $0.1\pi$ phase shifts over a full range of $2\pi$, thus allowing for phase control of an optical wave over a range of $2\pi$ and with a resolution of $0.1\pi$. Alternatively, IMEs of different lengths or different efficiencies may be used so as to achieve a desired resolution over a given range with fewer required IMEs (e.g., by being arranged such that the IMEs provide n-bit control of the index of refraction or of the phase shift itself). For example, an IMC with IMEs configured to provide n-bit control can comprise n IMEs that each provide a phase shift that is twice the phase shift of a preceding IME (e.g., a first IME provides a phase shift of $0.25\pi$, a second IME provides a phase shift of $0.5\pi$, and a third IME provides a phase shift of $\pi$).

Figure 1C:
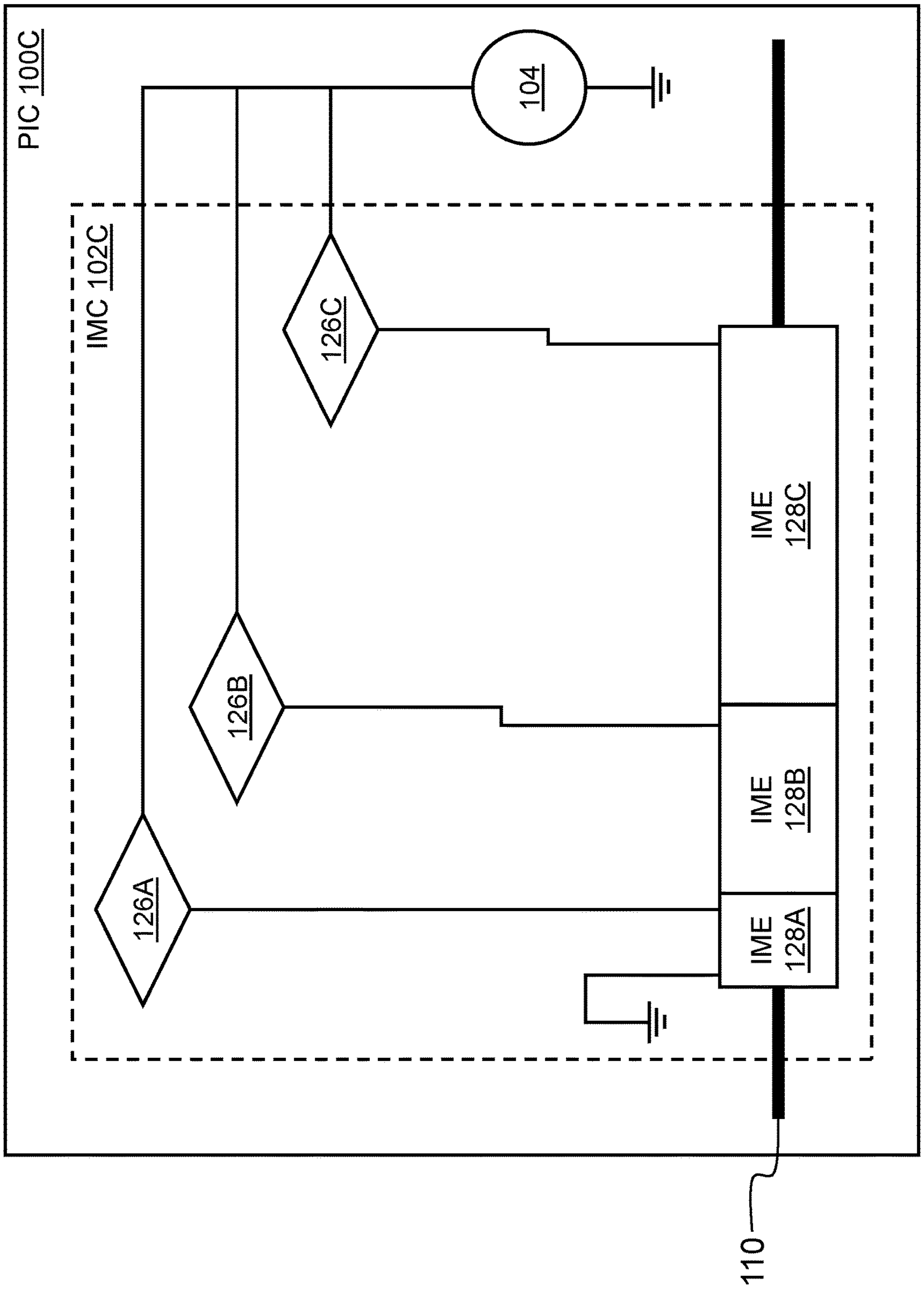
FIG. 1C is a schematic diagram of an example photonic integrated circuit.

FIG. 1C shows an example PIC 100C comprising an IMC 102C. An electrical power source 104 is located on the PIC 100C and is electrically connected to a first MEE 126A, a second MEE 126B, and a third MEE 126C. Each MEE is electrically connected to a respective IME, such that the first MEE 126A is electrically connected to a first IME 128A, the second MEE 126B is electrically connected to the second IME 128B, and the third MEE 126C is electrically connected to a third IME 128C. The IMEs are located in proximity to a waveguide 110 and modify an index of refraction over respective portions of the waveguide 110 based on respective electrical signals received by the MEEs and the electrical power source 104. The third IME 128C modifies the index of refraction of a respective portion of the waveguide 110 by a third amount. The second IME 128B modifies the index of refraction of a respective portion of the waveguide 110 by a second amount that is twice or half as much as the third amount. The first IME 128A modifies the index of refraction of a respective portion of the waveguide 110 by a first amount that is twice or half as much as the second amount and that is not equal to the third amount. In this example, the IMEs are all serially electrically connected to one another (e.g., the right side of the first IME 128A is electrically connected to the left side of the second IME 128B).

Figure 1D:
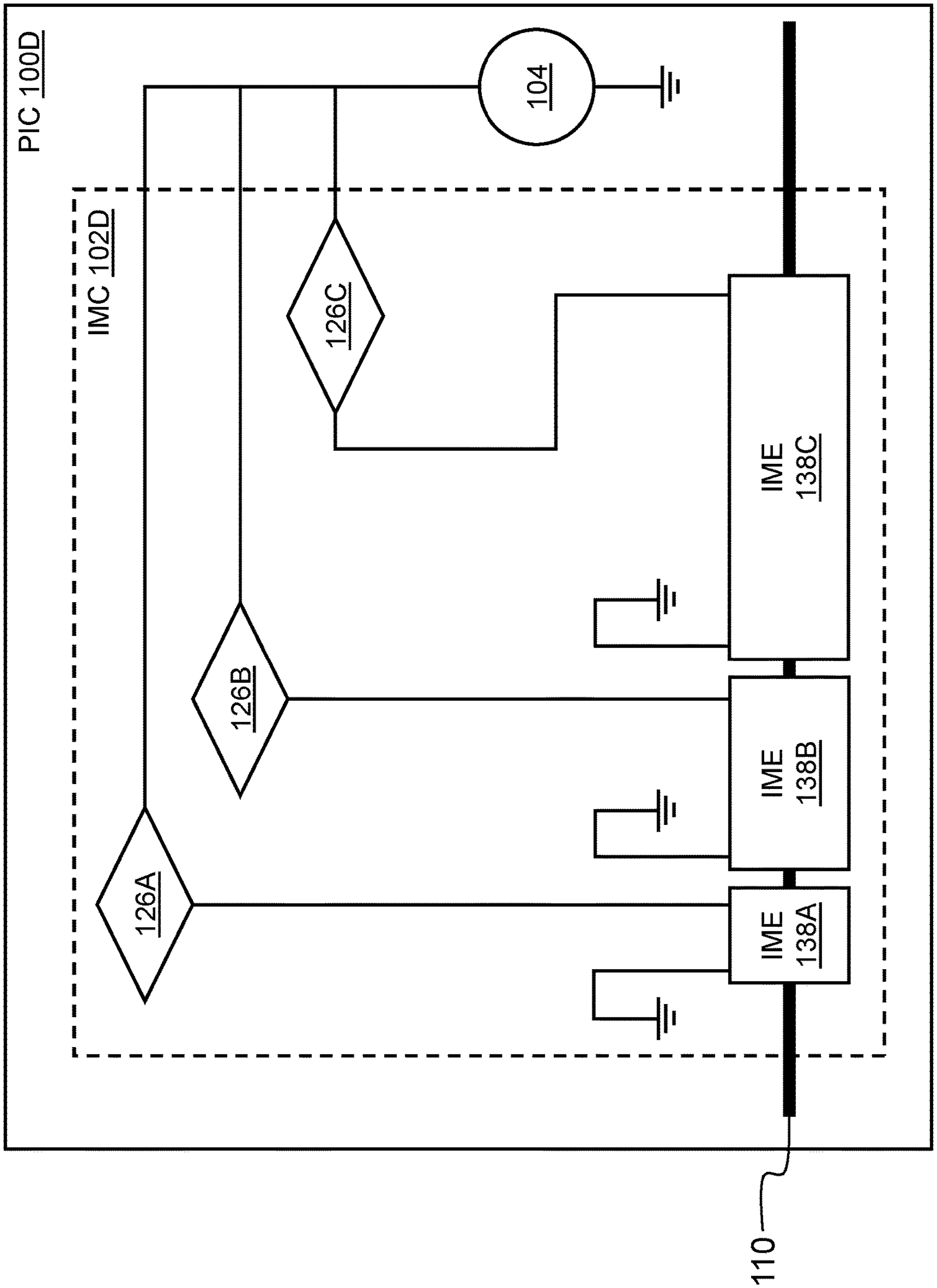
FIG. 1D is a schematic diagram of an example photonic integrated circuit.

FIG. 1D shows an example PIC 100D comprising an IMC 102D. An electrical power source 104 is located on the PIC 100D and is electrically connected to a first MEE 126A, a second MEE 126B, and a third MEE 126C. Each MEE is electrically connected to a respective IME, such that the first MEE 126A is electrically connected to a first IME 138A, the second MEE 126B is electrically connected to the second IME 138B, and the third MEE 126C is electrically connected to a third IME 138C. The IMEs are located in proximity to a waveguide 110 and modify an index of refraction over respective portions of the waveguide 110 based on respective electrical signals received by the MEEs and the electrical power source 104. The third IME 138C modifies the index of refraction of a respective portion of the waveguide 110 by a third amount. The second IME 138B modifies the index of refraction of a respective portion of the waveguide 110 by a second amount that is twice or half as much as the third amount. The first IME 138A modifies the index of refraction of a respective portion of the waveguide 110 by a first amount that is twice or half as much as the second amount and that is not equal to the third amount. In this example, the IMEs are electrically connected to one another in parallel when all of the MEEs are configured to be in a conductive configuration, and are not electrically connected to one another when all of the MEEs are configured to be in a nonconductive configuration. For example, the right side of the first IME 138A is not directly electrically connected to the left side of the second IME 138B. Such a configuration can be used, for example, when the IMEs are thermal phase shifters that change the index of refraction of the waveguide 110 based on the amount of electrical power dissipated across the IMEs. Such a configuration can also be used when the IMEs are PIN junctions (i.e., semiconductor junctions) that change the index of refraction of the waveguide 110 based on the amount of voltage applied across each PIN junction.

Figure 1E:
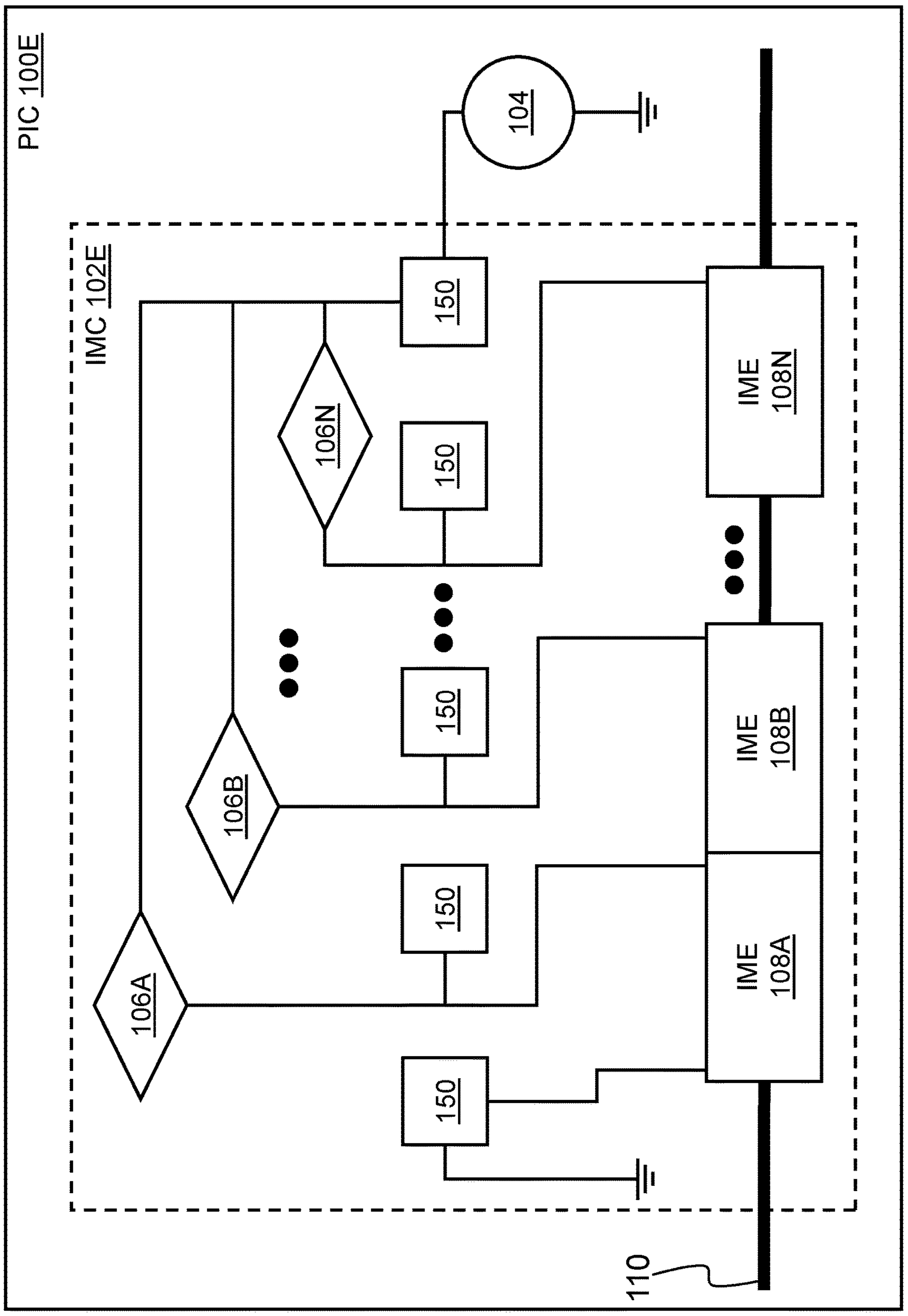
FIG. 1E is a schematic diagram of an example photonic integrated circuit.

FIG. 1E is a schematic diagram of an example PIC 100E comprising an IMC 102E. An electrical power source 104 is located on the PIC 100E and is electrically connected to N MEEs that include a first MEE 106A, a second MEE 106B, and an $N^{th}$ MEE 106N, with three black dots representing the remaining MEEs. Each MEE is electrically connected to a respective IME, such that the first MEE 106A is electrically connected to a first IME 108A, the second MEE 106B is electrically connected to the second IME 108B, and the $N^{th}$ MEE 106N is electrically connected to an $N^{th}$ IME 108N, with three black dots representing the remaining IMEs. The IMEs are located in proximity to a waveguide 110 and modify an index of refraction over respective portions of the waveguide 110 based on respective electrical signals received by the MEEs and the electrical power source 104. In this example, electrical contacts 150 allow for electrical measurements (e.g., of voltage or current) to be performed (1) between the electrical power source 104 and the MEEs, (2) between each MEE and its respective IME, and (3) between the first IME 108A and electrical ground. Additional electrical contacts (e.g., located between an MEE and a respective IME) are represented by three black dots. The electrical contacts 150 can be flat metallic surfaces or metallic vias, for example.

Figure 2A:
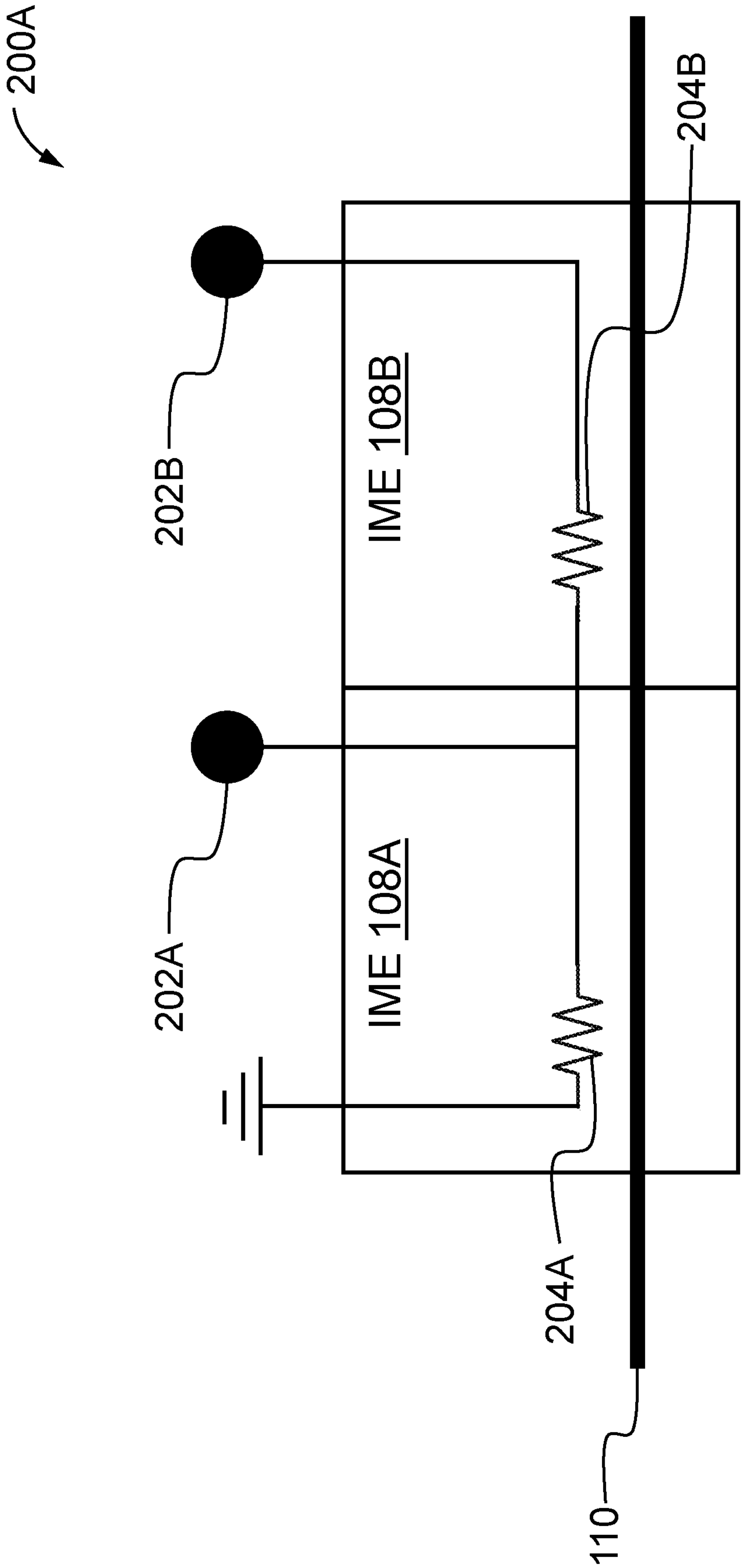
FIG. 2A is a schematic diagram of an example portion of an index-modifying configuration.

FIG. 2A shows an example portion of the IMC 102A shown in FIG. 1A. In this example, the first IME 108A is electrically connected at a first point 202A to a first MEE (e.g., the first MEE 106A shown in FIG. 1A) and the second IME 108B is electrically connected at a second point 202B to a second MEE (e.g., the second MEE 106B shown in FIG. 1A). The first IME 108A comprises a first TPS element 204A (thermal phase shifting element) that can be modelled as a resistor, where one end of the first TPS element 204A is electrically connected to ground and the other end is electrically connected to the first point 202A. The second IME 108B comprises a second TPS element 204B that can be modelled as a resistor, where one end of the second TPS element 204B is electrically connected to the first point 202A, and is therefore electrically connected to one end of the first TPS element 204A, and the other end is electrically connected to the second point 202B.

Referring again to FIG. 2A, in a first case, where the first point 202A is electrically disconnected from an electrical power source (e.g., the first MEE 106A is configured to be in a nonconductive configuration), and the second point 202B is electrically connected to the electrical power source (e.g., the second MEE 106B is configured to be in a conductive configuration), the first IME 108A and the second IME 108B are electrically connected in series. In the first case, there is a voltage across both the first TPS element 204A and across the second TPS element 204B, such that both TPS elements modify the index of refraction of the waveguide 110. In a second case, the first point 202A and the second point 202B are at the same voltage (e.g., both the first MEE 106A and the second MEE 106B shown in FIG. 1A are configured to be in a conductive configuration), such that there is a voltage across the first TPS element 204A and there is no voltage across the second TPS element 204B. In the second case, the first TPS element 204A modifies the index of refraction of the waveguide 110 and the second TPS element 204B does not modify the index of refraction of the waveguide 110. In a third case, the second point 202B is electrically disconnected from an electrical power source (e.g., the second MEE 106B is configured to be in a nonconductive configuration), and the first point 202A is electrically connected to the power source (e.g., the first MEE 106A is configured to be in a conductive configuration). In the third case, there is no voltage across the second TPS element 204B and the first TPS element 204A modifies the index of refraction of the waveguide 110 and the second TPS element 204B does not modify the index of refraction of the waveguide 110.

Referring again to FIG. 2A, the phase shift produced by the first TPS element 204A and the by the second TPS element 204B depends on the power dissipated across each TPS element. If the voltages used in both the first case, the second case, and the third case are equal, and if both TPS elements have the same resistance, then the power dissipated in the second and third case will be double that of the power dissipated in the first case. Recalling that the power dissipated is equal to the square of the voltage (across one or more resistive elements) divided by the resistance, the difference in power dissipated is attributable to the doubling of the resistance over which the voltage drop occurs in the first case compared to the second and third case.

Figure 2B:
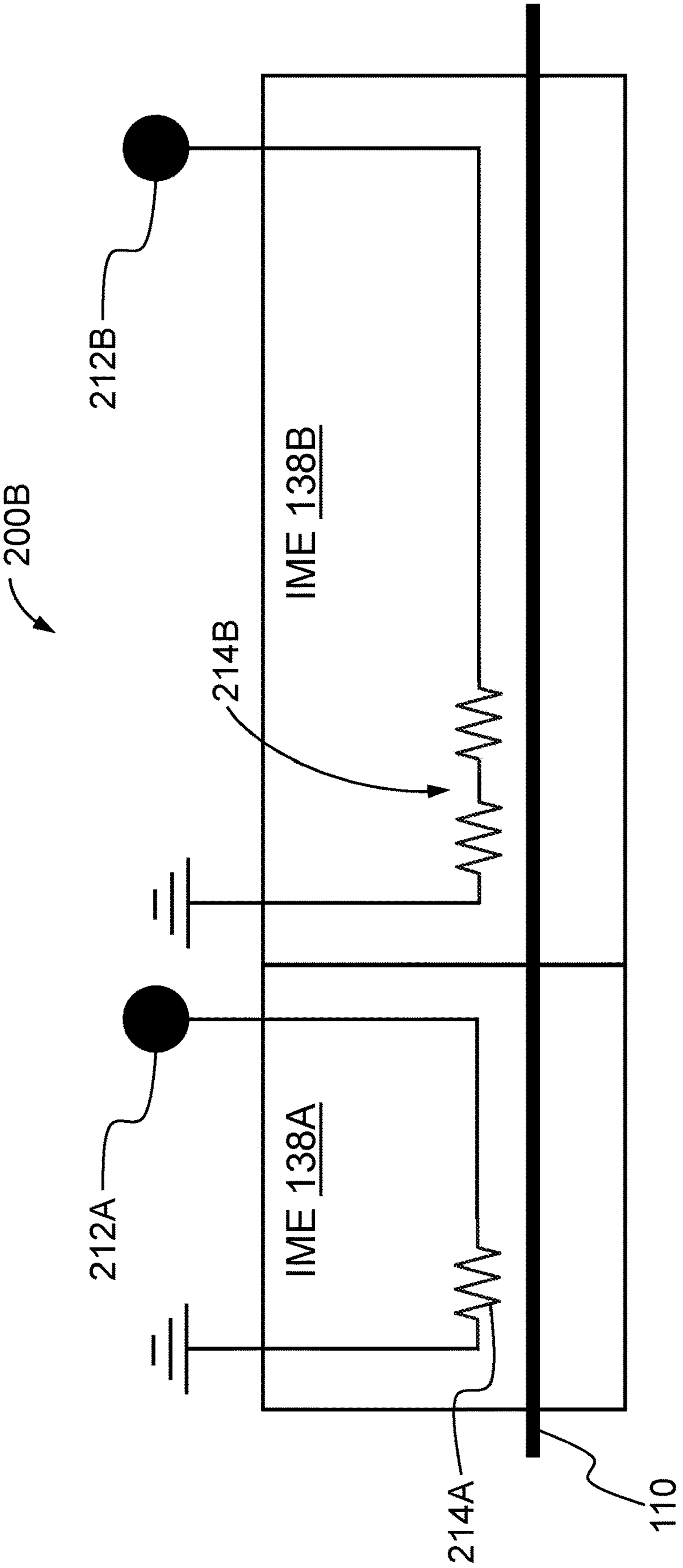
FIG. 2B is a schematic diagram of an example portion of an index-modifying configuration.

FIG. 2B shows an example portion of the IMC 102D shown in FIG. 1D. In this example, the first IME 138A is electrically connected at a first point 212A to a first MEE (e.g., the first MEE 126A shown in FIG. 1D) and the second IME 138B is electrically connected at a second point 212B to a second MEE (e.g., the second MEE 126B shown in FIG. 1D). The first IME 138A comprises a first TPS element 214A (thermal phase shifting element) that can be modelled as a resistor, where one end of the first TPS element 214A is electrically connected to ground and the other end is electrically connected to the first point 212A. The second IME 138B comprises a second TPS element that can each be modelled as a resistor that has twice the resistance of the first TPS element, where one end of the second TPS element 214B is electrically connected to ground and the other end is electrically connected to the second point 212B.

Referring again to FIG. 2B, in a first case, where the first point 212A and the second point 212B are at the same voltage (e.g., both the first MEE 126A and the second MEE 126B shown in FIG. 1D are configured to be in a conductive configuration), the first IME 108A and the second IME 108B are electrically connected in parallel and there is the same voltage across the first TPS element 214A and across the second TPS element 214B. Therefore, in the first case both TPS elements modify the index of refraction of the waveguide 110. In a second case, where the first point 212A is electrically disconnected from an electrical power source (e.g., the first MEE 126A is configured to be in a nonconductive configuration) and the second point 212B is electrically connected to the electrical power source (e.g., the second MEL 126B is configured to be in a conductive configuration), there is a voltage across only the second TPS element 214B, such that only the second TPS element 214B modifies the index of refraction of the waveguide 110. In both the first case and the second case, the power dissipated by the first IME 138A and the second IME 138B are additive since they are independent of one another (i.e., not serially electrically connected).

Figure 2C:
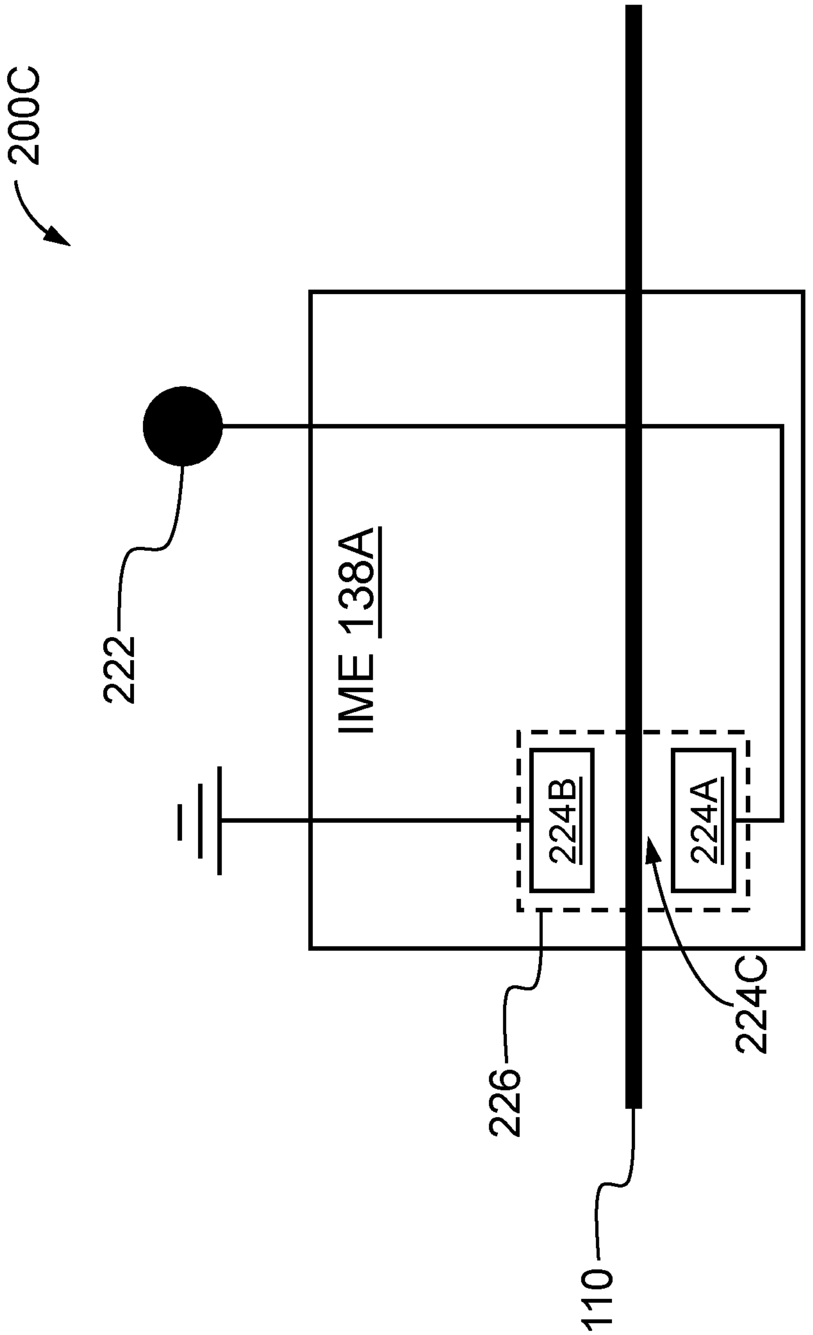
FIG. 2C is a schematic diagram of an example portion of an index-modifying configuration.

FIG. 2C shows an example portion of the IC 102D shown in FIG. 1D. In this example, the first IME 138A is electrically connected at a point 222 to a first MEE (e.g., the first MEE 126A shown in FIG. 1D). The first IME 138A comprises a p-type region 224A, an n-type region 224B, and an intrinsic region 224C composed of the waveguide 110 (e.g., silicon) that collectively form a PIN junction 226. The n-type region 224B is electrically connected to ground and the p-type region 224A is electrically connected to the point 222. In general, the PIN junction 226 can be forward biased, reverse biased, or unbiased (i.e., with no voltage across the PIN junction). In this example, changing the amount of voltage across the PIN junction 226 modifies the index of refraction of the waveguide 110.

ICs can also be used to modify the splitting ratio of a Mach-Zehnder interferometer (MZI) by controlling the relative phase between the two arms of the MZI. For example, the splitting ratios between a receiver port and a transmitter port of a PIC can be modified by utilizing one or more IMCs (e.g., located in one or both arms of an MZI).

Figure 3:
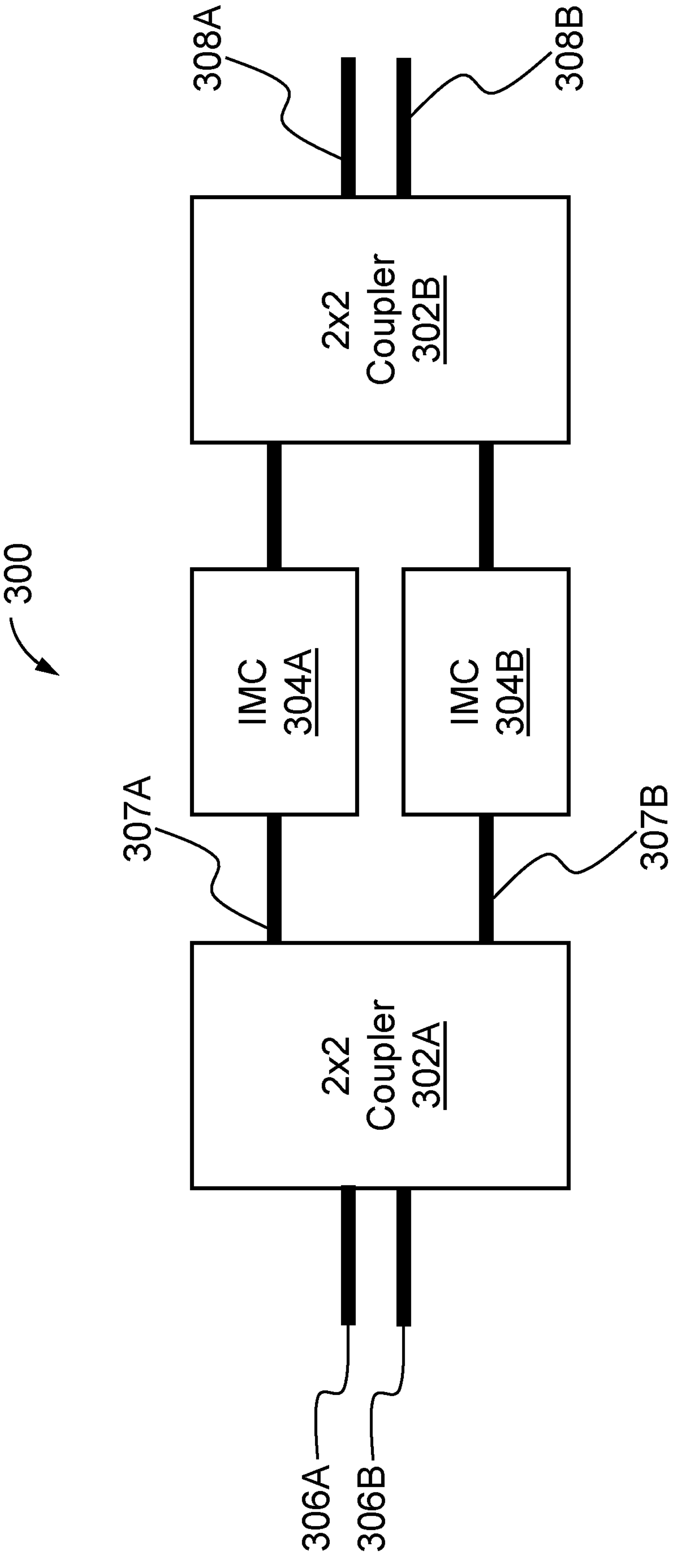
FIG. 3 is a schematic diagram of an example configurable 2×2 coupler.

FIG. 3 shows an example configurable 2×2 coupler 300 comprising a first 2×2 coupler 302A, a second 2×2 coupler 302B, a first IC 304A, and a second IC 304B. A first input waveguide 306A and a second input waveguide 306B are optically coupled to respective input ports of the first 2×2 coupler 302A. The first IC 304A is located in proximity to a first coupling waveguide 307A and the second IMC 304B is located in proximity to a second coupling waveguide 307B. The first coupling waveguide 307A and the second coupling waveguide 307B are each optically coupled to respective output ports of the first 2×2 coupler 302A and to respective input ports of the second 2×2 coupler 302B. A first output waveguide 308A and a second output waveguide 308B are optically coupled to respective output ports of the second 2×2 coupler 302B. The first IMC 304A is configured to modify the index of refraction of the first coupling waveguide 307A and the second IMC 304B is configured to modify the index of refraction of the second coupling waveguide 307B. Thus, the first IMC 304A and the second IMC 304B can be used to control the relative phase between (1) a first optical wave portion guided by the first coupling waveguide 307A and (2) a second optical wave portion guided by the second coupling waveguide 307B, which in turn controls the amount of the first optical wave portion and the amount of the second optical wave portion that are optically coupled by the second 2×2 coupler 302B to the first output waveguide 308A and to the second output waveguide 308B. In some example configurable 2×2 couplers, the second IMC 304B is optional and only the first IMC 304A is present.

As photonic platforms continue to expand and coherent communication becomes increasingly prevalent in data centers, the importance of yield may increase, such that techniques and designs that increase yield can be highly beneficial. While component improvement may play a role in increasing yield, it can also be important to consider the impact of circuit yield. In the context of such considerations, the ability to electrically disconnect (i.e., turn off) faulty sections of a die without discarding the entire unit can increase yield and efficiency.

Referring again to FIG. 3, the configurable 2×2 coupler 300 can be used to selectively couple an optical wave guided by the first input waveguide 306A to either the first output waveguide 308A or to the second output waveguide 308B. In such examples, the first output waveguide 308A can be optically coupled to a first subcircuit (not shown) and the second output waveguide 308B can be optically coupled to a second subcircuit (not shown). For example, if the first subcircuit and the second subcircuit are functioning on-chip monitoring photodiodes that are configured to have their respective photocurrents summed, any configuration of MEEs in the first IMC 304A and in the second IMC 304B may be used and will yield the same photocurrent sum. However, if the first subcircuit or the second subcircuit is malfunctioning, the first IMC 304A and/or the second IMC 304B can be configured to direct the optical wave to the remaining functioning subcircuit without adversely affecting the die yield.

Referring again to FIG. 3, the configurable 2×2 coupler 300 can also be used adjust the operating point of interferometric devices by balancing optical losses in different optical paths (e.g., by modifying the imaginary component of the index of refraction), so as to improve the extinction ratio, to improve the common-mode rejection ratio, or to adjust the optical power splitting ratio (e.g., to achieve higher accuracy of the hybrid angle).

In general, IMCs can be configured using a variety of techniques.

Figure 4:
FIG. 4 is a flowchart of an example photonic integrated circuit fabrication technique.

FIG. 4 shows a flowchart of an example PIC fabrication technique 400. The PIC fabrication technique 400 comprises forming a first waveguide portion 402 and forming a first set of index-modifying elements 404 located in proximity to the first waveguide portion, each configured to modify an index of refraction of the first waveguide portion based on a respective electrical signal. The PIC fabrication technique 400 further comprises forming an electrical power source 406 configured to supply one or more electrical signals. The PIC fabrication technique 400 further comprises forming a first set of modifiable electrical elements 408, each configured to be modifiable at least once between a conductive configuration that conducts electricity and a nonconductive configuration that does not conduct electricity, and each electrically connected to the electrical power source and to one or more respective index-modifying elements in the first set of index-modifying elements. The PIC fabrication technique 400 further comprises transmitting a first optical wave portion through the first waveguide portion 410. The PIC fabrication technique 400 further comprises determining first optical wave information 412 associated with the first optical wave portion after it traverses the first waveguide portion. The PIC fabrication technique 400 further comprises modifying one or more modifiable electrical elements 414 in a first set of modifiable electrical elements based at least in part on the first optical wave information.

As summarized above, in one aspect, in general, a method for fabricating a photonic integrated circuit comprises: forming a first waveguide portion; forming a first set of index-modifying elements located in proximity to the first waveguide portion, each configured to modify an index of refraction of the first waveguide portion based on a respective electrical signal; forming an electrical power source configured to supply one or more electrical signals; forming a first set of modifiable electrical elements, each configured to be modifiable at least once between a conductive configuration that conducts electricity and a nonconductive configuration that does not conduct electricity, and each electrically connected to the electrical power source and to one or more respective index-modifying elements in the first set of index-modifying elements; transmitting a first optical wave portion through the first waveguide portion; determining first optical wave information associated with the first optical wave portion after it traverses the first waveguide portion; and modifying one or more modifiable electrical elements in the first set of modifiable electrical elements based at least in part on the first optical wave information.

As summarized above, in another aspect, in general, an article of manufacture comprises: a first waveguide portion; a first set of index-modifying elements located in proximity to the first waveguide portion, each configured to modify an index of refraction of the first waveguide portion based on a respective electrical signal; an electrical power source configured to supply one or more electrical signals; a first set of modifiable electrical elements, each configured to be modifiable at least once between a conductive configuration that conducts electricity and a nonconductive configuration that does not conduct electricity, and each electrically connected to the electrical power source and to one or more respective index-modifying elements in the first set of index-modifying elements; a closed electrical path, where electrical current flows from the electrical power source and through (1) a first modifiable electrical element in the first set of modifiable electrical elements that is configured to be in a conductive configuration, and (2) a first index-modifying element in the first set of index-modifying elements; and an open electrical path, where no electrical current flows through (1) a second modifiable electrical element in the first set of modifiable electrical elements that is configured to be in a nonconductive configuration, and (2) a second index-modifying element in the first set of index-modifying elements.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An article of manufacture comprising:

a first waveguide portion;

a first set of index-modifying elements located in proximity to the first waveguide portion, each configured to modify an index of refraction of the first waveguide portion based on a respective electrical signal;

an electrical power source configured to supply one or more electrical signals;

a first set of modifiable electrical elements, each configured to be modifiable at least once between a conductive configuration that conducts electricity and a nonconductive configuration that does not conduct electricity, and each electrically connected to the electrical power source and to one or more respective index-modifying elements in the first set of index-modifying elements;

a closed electrical path, where electrical current flows from the electrical power source and through (1) a first modifiable electrical element in the first set of modifiable electrical elements that is configured to be in a conductive configuration, and (2) a first index-modifying element in the first set of index-modifying elements; and an open electrical path, where no electrical current flows through (1) a second modifiable electrical element in the first set of modifiable electrical elements that is configured to be in a nonconductive configuration, and (2) a second index-modifying element in the first set of index-modifying elements;

where the first set of index-modifying elements comprise at least one of a thermal phase-shifter, a PIN junction, or a non-centrosymmetric crystal.

2. The article of manufacture of claim 1, where the first set of modifiable electrical elements comprises at least one of a wire bond, a flip-chip bump, a redistribution layer, or a fuse-like element.

3. The article of manufacture of claim 1, where each index-modifying element in the first set of index-modifying elements is located in proximity to a respective sub-portion of the first waveguide portion and modifies a respective index of refraction of the respective sub-portion of the first waveguide portion.

4. The article of manufacture of claim 1, further comprising a second waveguide portion;

a second set of index-modifying elements located in proximity to the second waveguide portion, each configured to modify an index of refraction of the second waveguide portion based on a respective electrical signal; and a second set of modifiable electrical elements, each configured to be modifiable at least once between a conductive configuration that conducts electricity and a nonconductive configuration that does not conduct electricity, and each electrically connected to the electrical power source and to one or more respective index-modifying elements in the second set of index-modifying elements.

5. The article of manufacture of claim 4, where the first waveguide portion and the second waveguide portion form a portion of (1) a Mach-Zehnder interferometer, (2) a Michelson interferometer, (3) a multi-mode interferometer, (4) an interferometer comprising three or more optical paths, or (5) an N×M coupler comprising N input ports and M output ports.

6. The article of manufacture of claim 4, where the first waveguide portion and the second waveguide portion are each optically coupled to a first 2×2 coupler and to a second 2×2 coupler, and the first 2×2 coupler and the second 2×2 coupler each comprise two input optical ports and two output optical ports.

7. The article of manufacture of claim 1, where the first set of index-modifying elements comprises a first index-modifying element configured to modify the index of refraction of the first waveguide portion by a first amount for an applied voltage across the first index-modifying element; and a second index-modifying element configured to modify the index of refraction of the first waveguide portion by a second amount for an applied voltage across the second index-modifying element that is equal to the applied voltage across the first index-modifying element;

where the second amount is twice as large as the first amount.

8. The article of manufacture of claim 7, where the first set of index-modifying elements further comprises a third index-modifying element configured to modify the index of refraction of the first waveguide portion by a third amount that is twice as large as the second amount.

9. The article of manufacture of claim 1, where a third index-modifying element in the first set of index-modifying elements comprises a first portion at a first voltage; and a second portion at a second voltage that is equal to a voltage of a respective modifiable electrical element in the first set of modifiable electrical elements.

10. The article of manufacture of claim 9, where a fourth index-modifying element in the first set of index-modifying elements comprises a third portion at a third voltage; and a fourth portion at a fourth voltage that is equal to a voltage of a respective modifiable electrical element in the first set of modifiable electrical elements.

11. The article of manufacture of claim 10, where the third voltage is equal to either a ground voltage of the electrical power source or to the second voltage.

12. An article of manufacture comprising:

a first waveguide portion;

a first set of index-modifying elements located in proximity to the first waveguide portion, each configured to modify an index of refraction of the first waveguide portion based on a respective electrical signal;

an electrical power source configured to supply one or more electrical signals;

a first set of modifiable electrical elements, each configured to be modifiable at least once between a conductive configuration that conducts electricity and a nonconductive configuration that does not conduct electricity, and each electrically connected to the electrical power source and to one or more respective index-modifying elements in the first set of index-modifying elements;

a closed electrical path, where electrical current flows from the electrical power source and through (1) a first modifiable electrical element in the first set of modifiable electrical elements that is configured to be in a conductive configuration, and (2) a first index-modifying element in the first set of index-modifying elements; and an open electrical path, where no electrical current flows through (1) a second modifiable electrical element in the first set of modifiable electrical elements that is configured to be in a nonconductive configuration, and (2) a second index-modifying element in the first set of index-modifying elements;

where the first set of modifiable electrical elements comprises at least one of a wire bond, a flip-chip bump, a redistribution layer, or a fuse-like element.

13. The article of manufacture of claim 12, further comprising a second waveguide portion;

a second set of index-modifying elements located in proximity to the second waveguide portion, each configured to modify an index of refraction of the second waveguide portion based on a respective electrical signal; and a second set of modifiable electrical elements, each configured to be modifiable at least once between a conductive configuration that conducts electricity and a nonconductive configuration that does not conduct electricity, and each electrically connected to the electrical power source and to one or more respective index-modifying elements in the second set of index-modifying elements.

14. The article of manufacture of claim 13, where the first waveguide portion and the second waveguide portion are each optically coupled to a first 2×2 coupler and to a second 2×2 coupler, and the first 2×2 coupler and the second 2×2 coupler each comprise two input optical ports and two output optical ports.

15. The article of manufacture of claim 12, where the first set of index-modifying elements comprises a first index-modifying element configured to modify the index of refraction of the first waveguide portion by a first amount for an applied voltage across the first index-modifying element; and a second index-modifying element configured to modify the index of refraction of the first waveguide portion by a second amount for an applied voltage across the second index-modifying element that is equal to the applied voltage across the first index-modifying element;

where the second amount is twice as large as the first amount.

16. The article of manufacture of claim 15, where the first set of index-modifying elements further comprises a third index-modifying element configured to modify the index of refraction of the first waveguide portion by a third amount that is twice as large as the second amount.

17. The article of manufacture of claim 12, where a third index-modifying element in the first set of index-modifying elements comprises a first portion at a first voltage; and a second portion at a second voltage that is equal to a voltage of a respective modifiable electrical element in the first set of modifiable electrical elements.

18. The article of manufacture of claim 17, where a fourth index-modifying element in the first set of index-modifying elements comprises a third portion at a third voltage; and a fourth portion at a fourth voltage that is equal to a voltage of a respective modifiable electrical element in the first set of modifiable electrical elements.

19. The article of manufacture of claim 18, where the third voltage is equal to either a ground voltage of the electrical power source or to the second voltage.

20. An article of manufacture comprising:

a first waveguide portion;

a first set of index-modifying elements located in proximity to the first waveguide portion, each configured to modify an index of refraction of the first waveguide portion based on a respective electrical signal;

an electrical power source configured to supply one or more electrical signals;

a first set of modifiable electrical elements, each configured to be modifiable at least once between a conductive configuration that conducts electricity and a nonconductive configuration that does not conduct electricity, and each electrically connected to the electrical power source and to one or more respective index-modifying elements in the first set of index-modifying elements;

a closed electrical path, where electrical current flows from the electrical power source and through (1) a first modifiable electrical element in the first set of modifiable electrical elements that is configured to be in a conductive configuration, and (2) a first index-modifying element in the first set of index-modifying elements; and an open electrical path, where no electrical current flows through (1) a second modifiable electrical element in the first set of modifiable electrical elements that is configured to be in a nonconductive configuration, and (2) a second index-modifying element in the first set of index-modifying elements;

where each index-modifying element in the first set of index-modifying elements is located in proximity to a respective sub-portion of the first waveguide portion and modifies a respective index of refraction of the respective sub-portion of the first waveguide portion.

* * * * *